US012649268B2

(12) United States Patent
Rodriguez Outon

(10) Patent No.: US 12,649,268 B2
(45) Date of Patent: Jun. 9, 2026

(54) PROCESS AND SYSTEM FOR MANUFACTURING PRODUCTS CAST WITH POLYURETHANE AND HAVING A CONSTANT CROSS-SECTION

(71) Applicant: INDRESMAT, S.L., Barcelona (ES)

(72) Inventor: Pablo Rodriguez Outon, Barcelona (ES)

(73) Assignee: INDRESMAT, S.L., Barcelona (ES)

( * ) Notice: Subject to any disclaimer, the term of this patent is extended or adjusted under 35 U.S.C. 154(b) by 82 days.

(21) Appl. No.: 18/574,884

(22) PCT Filed: Jun. 13, 2022

(86) PCT No.: PCT/ES2022/070371
§ 371 (c)(1),
(2) Date: Dec. 28, 2023

(87) PCT Pub. No.: WO2023/275417
PCT Pub. Date: Jan. 5, 2023

(65) Prior Publication Data
US 2025/0026051 A1 Jan. 23, 2025

(30) Foreign Application Priority Data
Jul. 2, 2021 (EP) .................................... 21382588

(51) Int. Cl.
*B29C 44/42* (2006.01)
*B29C 31/00* (2006.01)
(Continued)

(52) U.S. Cl.
CPC .......... *B29C 44/428* (2013.01); *B29C 31/006* (2013.01); *B29C 33/3842* (2013.01);
(Continued)

(58) Field of Classification Search
CPC .................................................... B29C 44/588
See application file for complete search history.

(56) References Cited

U.S. PATENT DOCUMENTS 8,419,406 B2 * 4/2013 Karlsson ............... B29C 44/027
425/149
11,298,864 B2 * 4/2022 Rodriguez Outon ... B29C 48/30
2017/0113434 A1 4/2017 McCloud

FOREIGN PATENT DOCUMENTS

DE 2159982 A1 6/1973
DE 3541701 A1 5/1987
(Continued)

OTHER PUBLICATIONS

Int'l Search Report for PCT/ES2022/070371, dated Sep. 23, 2022.

*Primary Examiner* — Benjamin A Schiffman
(74) *Attorney, Agent, or Firm* — MaxGoLaw PLLC

(57) ABSTRACT

A process and system for manufacturing polyurethane products having a continuous section includes placing and fastening multiple injection molds (3) on which is acting, at least, a force in axial direction and, optionally another in radial direction. During the process, the opening is avoided during the polyurethane foaming; injection of the polyurethane in a mold or molds (3), tilted or in vertical on a bench (4) to accumulate $CO_2$ bubbles, at the top part during the polyurethane foaming; waiting for the polyurethane be expanded and withdrawing the mold (3) from the bench (4). The system includes: a feeder (1) of polyurethane; injection system or machine (2) in line, at least, a mold (3) and a bench (4) for placing and fastening the molds (3) located tilted or in vertical.

7 Claims, 8 Drawing Sheets

(51) Int. Cl.

| | | |
|---|---|---|
| *B29C 33/38* | (2006.01) |
| *B29C 44/58* | (2006.01) |
| *B29C 45/00* | (2006.01) |
| *B29C 45/26* | (2006.01) |
| *B29D 12/00* | (2006.01) |
| *B29D 99/00* | (2010.01) |
| B29K 75/00 | (2006.01) |
| B29K 105/04 | (2006.01) |
| B29L 31/00 | (2006.01) |

(52) U.S. Cl.

CPC .............. *B29C 44/42* (2013.01); *B29C 44/58* (2013.01); *B29C 44/588* (2013.01); *B29C 45/0001* (2013.01); *B29C 45/26* (2013.01); *B29D 12/00* (2013.01); *B29D 99/0003* (2013.01); *B29K 2075/00* (2013.01); *B29K 2105/04* (2013.01); *B29L 2031/724* (2013.01); *B29L 2031/778* (2013.01)

(56) References Cited

FOREIGN PATENT DOCUMENTS

| | | | |
|---|---|---|---|
| GB | 1360857 | A | 7/1974 |
| GB | 1439191 | A | 6/1976 |
| JP | 2002254447 | A | 9/2002 |
| WO | 2001030880 | A1 | 5/2001 |
| WO | 2008103093 | A1 | 8/2008 |
| WO | 2013054255 | A1 | 4/2013 |

* cited by examiner

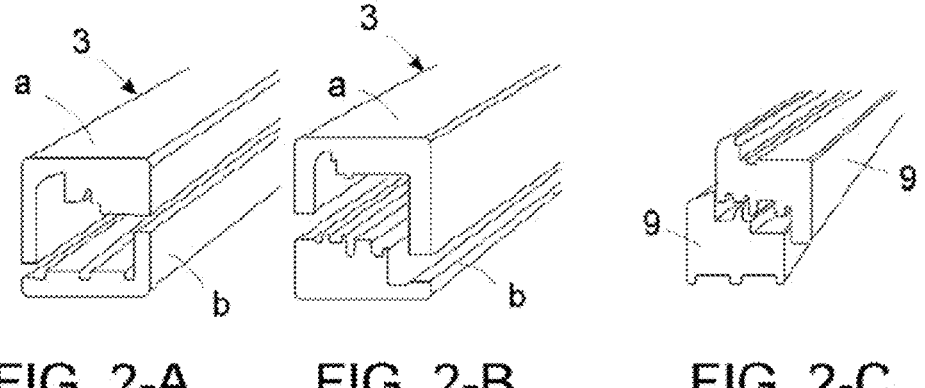
FIG. 2-A          FIG. 2-B          FIG. 2-C
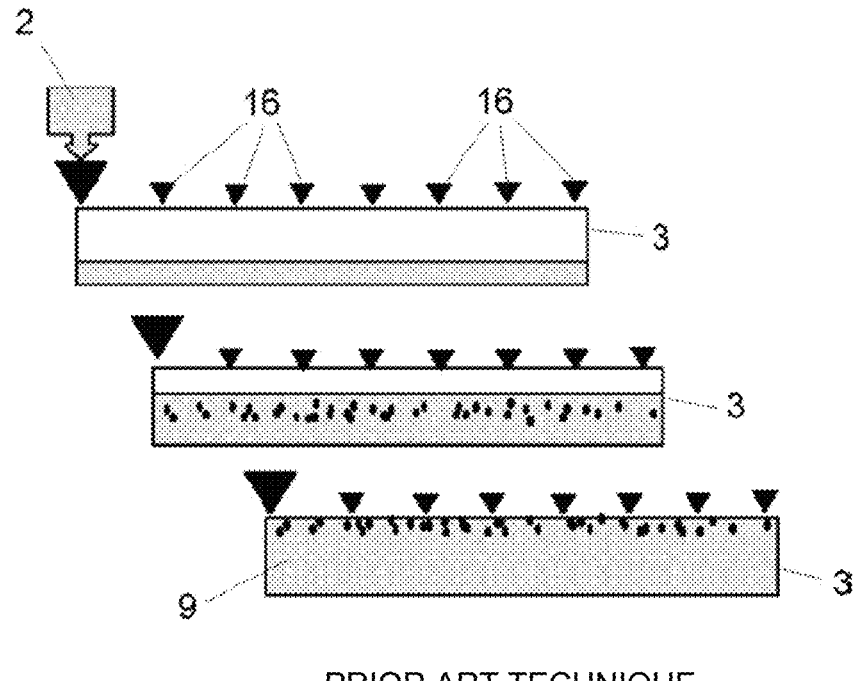
PRIOR ART TECHNIQUE
FIG. 3

PROCESS AND SYSTEM FOR MANUFACTURING PRODUCTS CAST WITH POLYURETHANE AND HAVING A CONSTANT CROSS-SECTION

FIELD OF APPLICATION OF THE INVENTION

The field of application of this invention is within the sector of the industry engaged in manufacturing polyurethane products, including at same time the scope of the frames and closings for doors and windows.

BACKGROUND OF THE INVENTION

As it is well-known, the closings for doors and windows are an essential part of the correct buildings insulation.

Currently, most of the frames for doors and windows are either of plastic or of wood or metal or a combination of the said materials.

The main problem of these materials is the manufacturing high energy cost and the insulation poorness. In addition, in the case of combined frames, besides the manufacturing cost increase, recycling is hindered as it requires a prior sorting process.

A cheaper product, more efficient as for insulation and easy to manufacture, such as polyurethane would be desirable.

Until now, however, the manufacturing proceedings of polyurethane products do not allow a suitable finish for their use in doors and windows frames, involving high post-processing costs.

One of the main problems is the fact that, in the manufacture of polyurethane products by injection in molds, holes and cavities occur on the product top surface due to $CO_2$ bubbles generation in the foaming process, therefore, in the case of profiles for frames, if they are arranged in horizontal position, as it is usual, the said holes and cavities will be generated along the full top surface of the molded frame, thus, a product postprocessing will be required to eliminate them.

Therefore, it would be desirable to avoid the said defects, that are typical in the horizontal molds because the top surface is accessible to the air and to the $CO_2$ bubbles generated during the foaming reaction, therefore they require several air outlets to minimize the said defects.

In the FIG. 3, the filling in horizontal of the molds and subsequent bubbles formation on the top face of the polyurethane material within them can be seen, which, with a material inlet, the existence of many air exhaust outlets is necessary.

Another manufacturing problems of this type of products is the molds high cost, as they use to be machined parts of aluminum or other metal, therefore it would be desirable to cut down the cost of the said molds by means of the use of metal molds made of extruded parts, preferably of aluminum, contemplating the inclusion of automated technology to handle multiple molds.

The objective of this invention therefore is to develop an improved manufacturing process of polyurethane products, essentially focused on the manufacture of polyurethan frames for doors and windows closings made of the said material, allowing to offer thermal and sound insulation, cheaper prices and recycling easiness.

On the other hand, and as reference to the current state-of-the-art, it shall be pointed out that, at least the applicant is not aware of the existence of any other process or system for manufacturing this type of cast products of polyurethane that possesses technical, structural and constructive characteristics equal or similar to those of the present that is claimed herein possess.

EXPLANATION OF THE INVENTION

The process and system for manufacturing polyurethane cast products having a constant section that the invention proposes are configured as an optimum solution to the above-mentioned objective, the characterizing details distinguishing them duly appearing in the final claims attached to this description.

What the invention proposes, as it was said before is, on the one hand, a process for the manufacture of polyurethane products, namely products consisting in injected polyurethane profiles to form frames and leaves for doors and windows (thereafter, frames), which, essentially, is based on serial injection of multiple metallic molds formed either by a tubular part or by two parts that fit together leaving a cavity having the shape of the part and on which is acting, at least, a force in axial direction and, in the case of two parts, another force in radial direction to avoid its opening during polyurethane foaming, and where the injection of the polyurethane liquid resin is carried out by one of the open ends of the said molds, that are elongated to form the said frames and that are located either in vertical or in tilted position, avoiding that aesthetic surface defects are formed, such as holes and cavities provoked by $CO_2$ bubbles and that should require postprocessing the product obtained, a second feature of the invention being a system to carry out the said process.

More concretely, the process object of the invention for the manufacture of the said polyurethane cast products is, preferably, a serial molding process by injection that, anyway comprises, essentially the following steps:

A step of placing and fastening an injection mold, preferably a series of elongated molds and obtained by extrusion without any further modification or adaptation, on a bench prepared for this and avoiding that the mold opens during the polyurethane foaming, that means, closing it at the lower part to prevent that the product goes out and, if it is formed by two parts, avoiding that they are taken apart.

A step of polyurethane injection by one of the ends of the mold or molds, that will be arranged tilted or in vertical on a bench, to accumulate the possible formation of holes and cavities provoked by $CO_2$ bubbles, only at the top part of the mold during the polyurethane foaming process.

A step of waiting for the polyurethane be expanded.

And a step of withdrawing the mold from the bench.

Optionally, the process comprises, in addition, one or several additional steps consisting, preferably, in the following ones:

A step of molds rest for the polyurethane curing, so that it is made sure that the part is perfectly finished before going on with its handling.

A step of molds opening and product withdrawal out of the molds, having care that each part follows a different path in the production line, on one side the molds or parts thereof, to allow their eventual re-use and on the other side the product obtained.

A step of molds cleaning to make sure their re-use in perfect state, avoiding the existence of possible accumulated remains on the mold internal surface.

A step of molds closing prior to the polyurethane injection, proceeding to close the lower part to avoid its going out from it by gravity and, if it is fit, proceeding to fix the two parts of each mold to each other as it is, preferably, an extruded mold and it can have either a tubular configuration or be formed by two parts.

During the step in which the mold is on the bench, the process can include an intermediary step to carry out a change in the mold tilt, providing thus a perfect setting of the product by provoking possible $CO_2$ bubbles raising and let them accumulate only at the top part of the mold.

And a step of product finish, that can include cutting a portion thereof to throw out the part of the top end where the holes and cavities formed by the $CO_2$ bubbles have concentrated and/or covering the part obtained with some coating.

In addition, it is important to point out that, in the step of polyurethane injection in the mold or molds arranged tilted or in vertical, in a way of embodiment of the proceeding, the said product injection is carried out by the open top end of the mold, that serves for the inlet of material and as air exhaust, which occurs at the same time.

And, in an alternative embodiment of the proceeding, filling is carried out by the open lower end of the mold, in which case it is contemplated that there exists an air outlet at the top end of the mold, with the advantage that in this option staining and turbulence are avoided during the polyurethane liquid resin drop.

Last, it shall be pointed out that, in a way of embodiment, at least the step of polyurethane injection in the mold or molds is carried out by means of a manual process with the molds arranged, tilted or in vertical, in a fixed manner directly on the bench.

And, another alternative embodiment, at least the said step of polyurethane injection in the mold or molds is carried out by means of in line, continuous or half continuous process, in which case the bench includes moving means, for example a conveyor belt, where the molds, arranged in tilted or vertical position, are being positioned so that the injection is multiple and in line.

On its hand, the system object of the invention for manufacturing polyurethane products following the previously exposed process, essentially comprises the following elements:

At least an injection mold.

A polyurethane injection system or machine adapted to inject polyurethane in an injection mold.

And a bench that fastens the injection mold under the injection system.

Optionally, in addition, the system for manufacturing polyurethane cast products also comprises the following:

A system that moves the injection molds towards the injection system and takes them out after the polyurethane has been injected.

A system that, after the foaming, places the injection molds in storing units for their curing.

A system that opens the mold and takes out the part or product obtained within it A system that cleans the injection molds.

And a system that closes the injection molds and prepares them to be newly used.

Preferably, the system disclosed is an automated system that administers all the sub-systems in a synchronized manner to carry out the process of serial production programmed and monitored in an environment of Industry 4.0.

Preferably, the molds have been manufactured by extrusion without any type of further modification or adaptation and they are open by their two ends.

The bench includes means that close one of the ends of the injection mold and allows the polyurethane injection by its other end.

Closing the molds can be done on the bench, for example, by means of some element that keeps the molds closed when the polyurethane is foaming and pressure is exerted from inside or the molds can be previously closed, for example by means of girths or clamps that keep the molds closed when the polyurethane is foaming and a pressure is exerted from inside.

In addition, the bench can be fixed and incorporates the molds in a fixed manner as well as the closing means and axial pressure and, in the event of molds formed by two parts, closing means and radial pressure, to carry out the injection process in a manual manner. Or, in another embodiment, the bench can include moving means, for example a conveyor belt, where the molds, fastened through stabilizing guides, are moving under a product injection system or machine, and are fastened to axial pressure closing means, allowing to carry out the in-line injection process either continuous or half continuous.

With this, the advantages provided by the process and system object of the invention are multiple, as it is exposed thereafter.

As it was commented in preceding points, the reason why the molds of the polyurethane parts or products to be manufactured are placed in vertical position and that preferably they are elongated to form the profiles of a frame is to avoid aesthetic surface defects such as holes and cavities along the full cast frame that would require a post-processing. These defects are typical in the horizontal molds because the top surface is accessible to the air and the $CO_2$ bubbles generated during the reaction of foam forming, therefore several air outlets are required to minimize it. Instead, with the vertical molding configuration, the inlet acts as a huge air vent on the top part of the mold to efficiently exhaust the air and the bubbles while it concentrates all the defects on the top part after the curing reaction of the part. Then, after the withdrawal of the part, the top edge can be discarded and a frame free of defects is obtained without post-processing requirements.

Another main point of the serial injection molding process of the invention is the use of molds of aluminum made of one or two extruded parts instead of machined parts as it is usual. The use of molding parts of extruded material significantly cut down the manufacturing cost of the molds. While a 3-m CNC milled aluminum, mold is worth 8,000€, the same mold made of extruded parts is worth 250€, which means a great cost saving. This allows the use of hundreds of molds in a serial manufacturing process with higher productivity, although, as there are many molds involved in this process, a more automated technology is required to administer molds in an environment of Industry 4.0.

The significant cost cut down obtained in the manufacture of molds by means of extrusion makes possible to use a great number of molds to develop a reactive serial injection molding process, as well as using a large range of molds designs simultaneously for different types of products, namely profiles for doors and windows frames. Therefore, the process and system object of the invention advantageously allows a highly productive and versatile production upon request, that saves energy, operating costs and unnecessary stocks of cast frames because less storage space is required.

In addition, the great number of molds involved allows to increase the time of the parts remaining in the mold, this being a critical factor for the withdrawal of polyurethane parts because the longer this time, higher is the curing degree the resin will have, avoiding stresses during the withdrawal that can provoke the part curving or deforming.

On the other hand, recycling is much less a problem than the multilayer windows due to its composition of a single material, the material being taken apart from the metal or glass by floating in water after a crushing process. The resulting crushed polyurethane shavings can be easily ground to obtain a micronized powder that is newly introduced as reinforcing filler in up to 25% in the manufacturing process, having an excellent mechanical and chemical compatibility with the liquid polyurethane resins.

SUMMARY OF THE INVENTION

The invention, as stated in the title of this specification, refers to a process and system for manufacturing castable products of polyurethane having a constant section, that contributes, to the function to which they are designed, with advantages and characteristics that will be disclosed in detail thereafter.

The object of this invention refers to a process for manufacturing products of polyurethane, namely injected polyurethane profiles having a constant section to form doors and windows frames, which, essentially, in based on serial injection of multiple metallic molds formed as a tubular part or two parts that fit together leaving a cavity having the shape of the part and on which is acting, at least, a force in axial direction and, in the case of two parts, another force in radial direction to avoid its opening during the polyurethane foaming, and where the injection of polyurethane liquid resin is carried out by one of the ends of the said molds, that are elongated to form the said frames and are located either in vertical or in tilted position, to facilitate air exhausting during its expansion and avoid aesthetic surface defects, such as holes and cavities along the full molded frame that should require postprocessing the product obtained, a second feature of the invention being a system to carry out the said process and that comprises a bench to placing and fastening, either fixed or in movement, the molds in tilted or vertical position and mold closing means, at least, of axial pressure.

BRIEF DESCRIPTION OF THE DRAWINGS

To complement the description that is being carried out and in order to assist to best understand the characteristics of the invention, attached to this specification, as an integral part thereof, there is a drawing in which, for illustration and no limitation purpose, the following has been represented:

The FIG. 1.—It shows a schematic view of an example of embodiment of the system for manufacturing polyurethane cast products having a constant section object of the invention, the mains parts and elements it comprises can be seen;

FIGS. 2-A, 2-B and 2-C.—They show respective views in perspective, an example of two extruded parts forming a first example of a two-parts mold for forming a polyurethane profile for a window frame, an example of two other extruded parts forming the two parts of a second example of mold for forming another polyurethane profile, in this case for a window leaf and its respective polyurethane parts obtained with the said molds and forming the frame and leaf profile;

FIG. 3.—It shows a schematic side elevation view of several molds in the filling step arranged in horizontal, according to the prior art;

PREFERRED EMBODIMENT OF THE INVENTION

Figure 1:
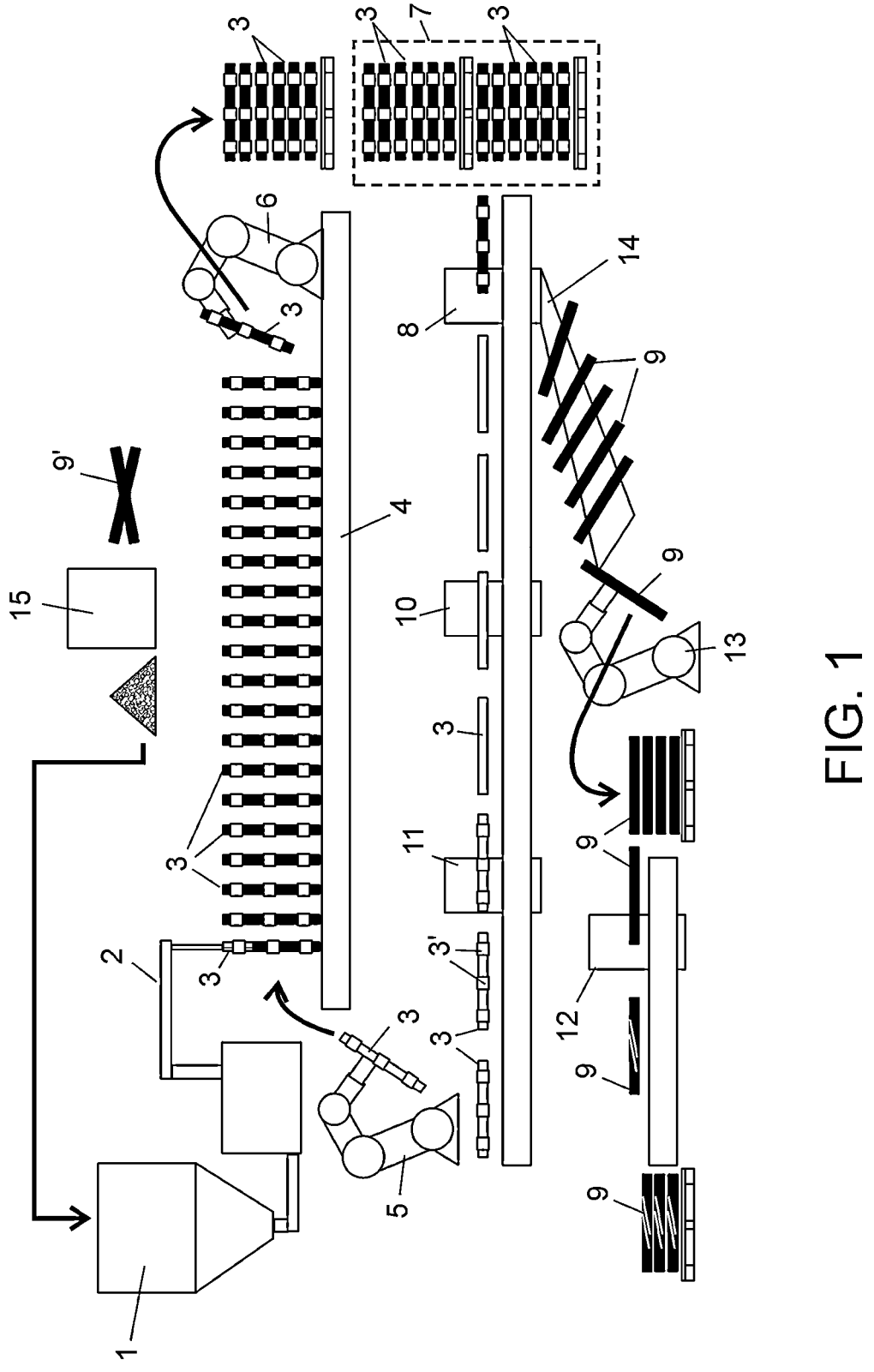

Seen the figure disclosed, and according to the numerals adopted in them, a non-limiting example of embodiment of the system for manufacturing polyurethane cast products having a constant section of the invention can be seen, which comprises what is disclosed in detail below.

Thus, as it can be seen in the said figure, the system for manufacturing polyurethane products, preferably products consisting in elongated parts (9), for example profiles for forming frames for doors and windows, essentially comprises the following elements:

- a feeder (1) of polyurethane product,
- an injection system or machine (2) in line, that injects the product in its liquid or fluid form within the molds (3),
- at least, a mold (3) preferably a series of molds (3), having the shape of the parts to be manufactured, that are open by, at least, a top end, and
- a bench (4) for placing and fastening the molds (3) located tilted or in vertical.

Preferably, the system is an automated system that, in a preferred embodiment of the invention, comprises in addition:

- a molds (3) provider (5) and extractor (6) system that, first moves the molds (3) towards the injection system (2) and, after the polyurethane has been injected, withdraws them from the injection line (2), for which, preferably, it is formed by two robotic arms, one being provider (5) and the other one being extractor (6), installed on both ends of the bench (4).

Preferably, the manufacturing system also comprises a storing unit (7) in which the extractor system (6), after the polyurethane foaming within the mold (3), places the molds (3) for their curing, preferably in horizontal position.

Preferably, the manufacturing system also comprises an opening system (8) of molds that, in the event that they are formed by two parts (a, b) opens the said two parts and, anyway, takes out the cured part (9), taking apart the production line by one side of the mold (3), for its re-use, and by the other the polyurethane parts (9) formed for their finish.

Preferably, the manufacturing system comprises a molds (3) cleaning system (10), where the molds (3) arrive from the previous opening system (8), for their cleaning and re-use.

Preferably, the manufacturing system comprises a closing system (11) that, at least, closes exerting axial pressure a mold end (3), preferably the lower.

In an embodiment, the closing system (11) of the molds (3), that closes them by the lower part, is integrated in the placing and fastening bench (4) itself, by means of an element that keeps the molds (3) closed when the polyurethane foams and the pressure is exerted from inside. Thus, the bench (4), in addition to placing and fastening the injection mold (3), at the same time closes one of the injection mold ends (3), preferably the lower and allows the polyurethane injection by its other end, the top end.

In addition, when the mold (3) is formed by two parts (a,b), the closing system (11) also comprises closing means with radial pressure to keep the parts of the mold (3) joined to each other.

According to the FIGS. 6 to 12, three different options of the said closing system (11) are seen without others are discarded.

Figure 6:
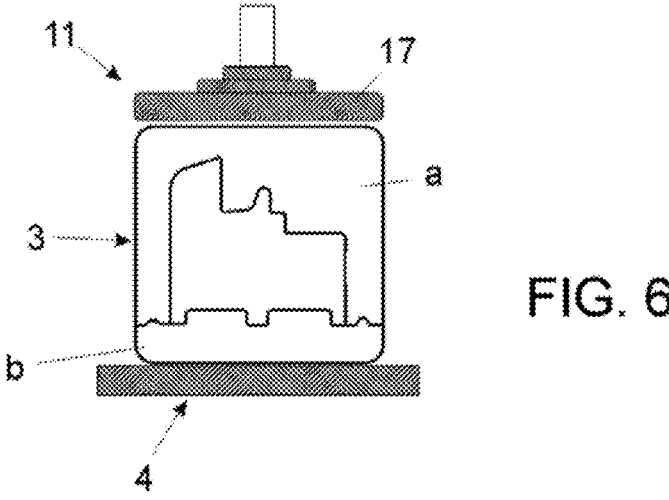
FIG. 6.—It shows an elevation view of the end of a mold, according to the system of the invention, in an example with closing system by axial pressure with a moving piston-shaped device.
Figure 7:
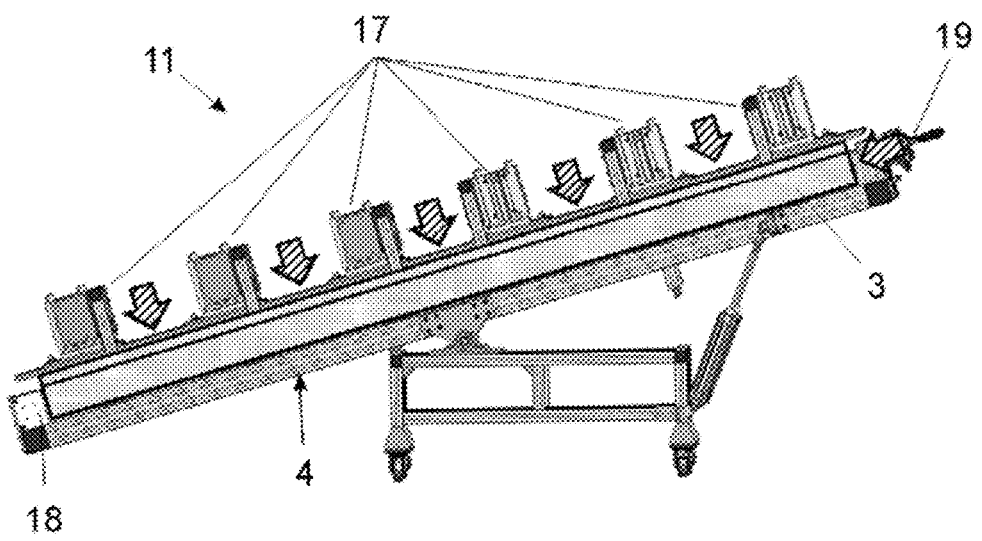
FIGS. 7 and 8.—They show both side elevation and top perspective views of an example of bench with molds and closing system by axial pressure with a moving piston-shaped device.
Figure 8:
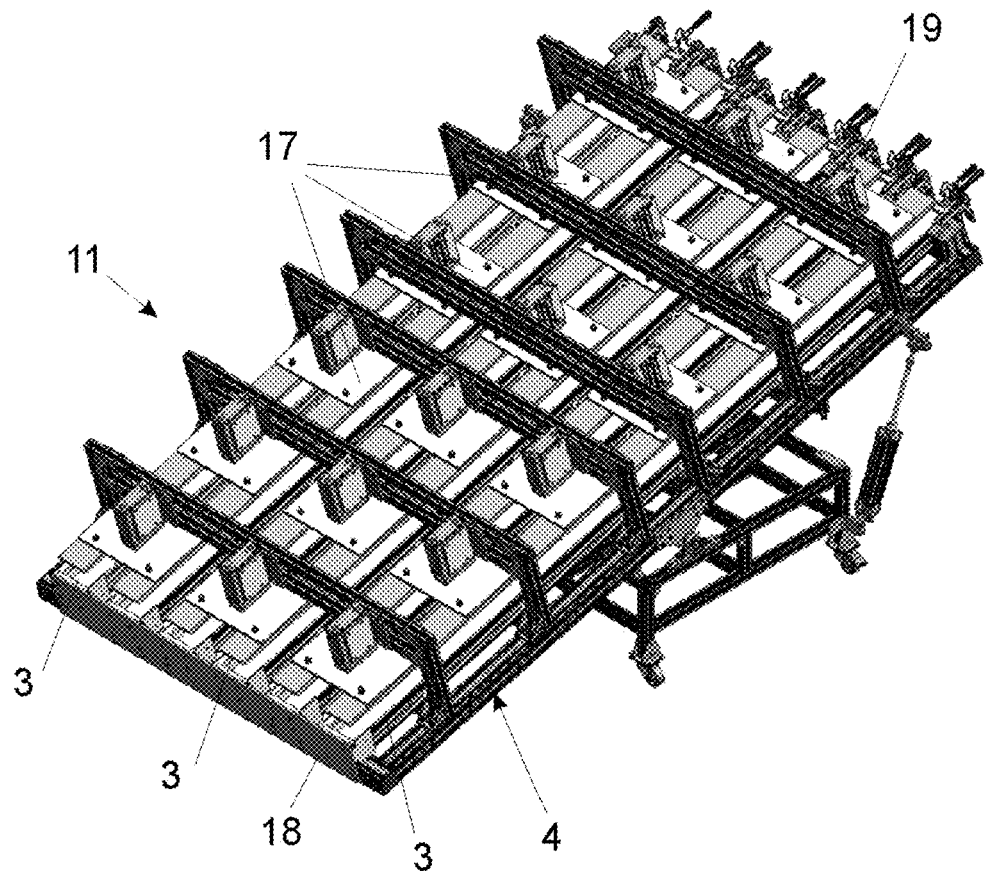

Concretely, in a first option, that can be seen in the FIGS. 6, 7 and 8, the closing system (11) that keeps the two parts (a, b) joined that form the mold (3) is a closing system by axial and radial pressure that comprises a piston-shaped moving device (17).

According to the FIG. 7, it can be seen that the bench (4) where several molds (3) are incorporated, they are closed by their lower end with a lower lid (18) and by its top end, after being filled with a gate-shaped axial pressure element (19), as well as along them with several radial pressure pistons (17).

Figure 9:
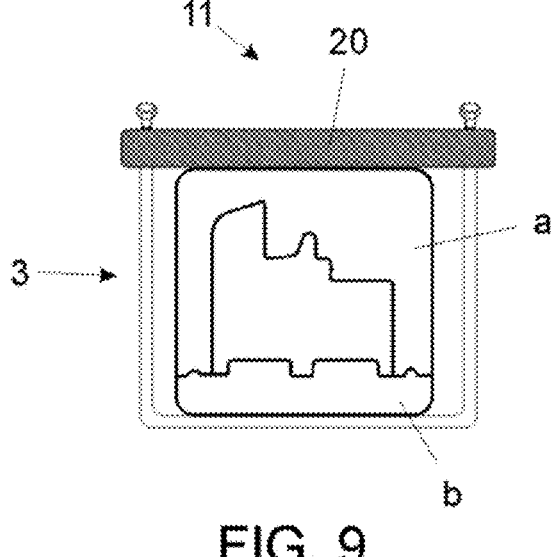
FIG. 9.—It shows an elevation view of the end of the mold, according to the system of the invention, in an example with closing system by axial pressure with a fixed exchangeable strut-shaped device.
Figure 10:
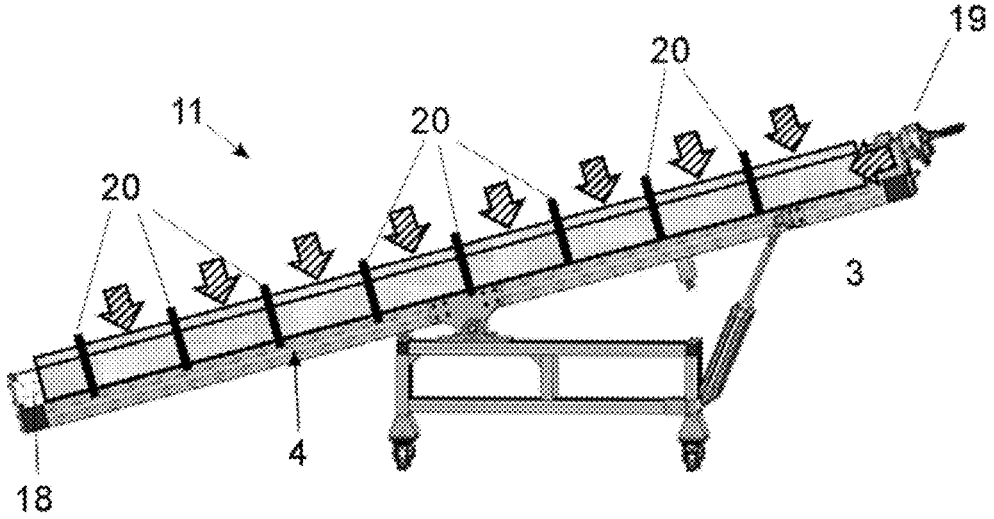
FIG. 10.—It shows a side elevation view of the bench with the closing system of molds shown in the FIG. 9.

In another option of embodiment, shown in the FIGS. 9 and 10, the closing system 11 of the two parts (a, b) of the mold (3) is a closing system by axial and radial pressure that comprises a fixed strut-shaped exchangeable device (20). According to the FIG. 10 it can be seen how in the bench (4), where several molds (3) are incorporated, they are closed by their lower end with a lower lid (18) and by their top end, after being filled, with a gate-shaped axial pressure element (19), as well as along them with several radial pressure struts (20).

Figure 11:
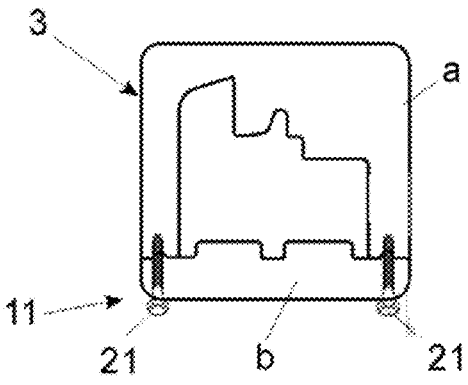
FIG. 11.—It shows an elevation view of the end of a mold according to the system of the invention, in this case in an example of closing system by axial pressure with a fixed threaded screw-shaped device.
Figure 12:
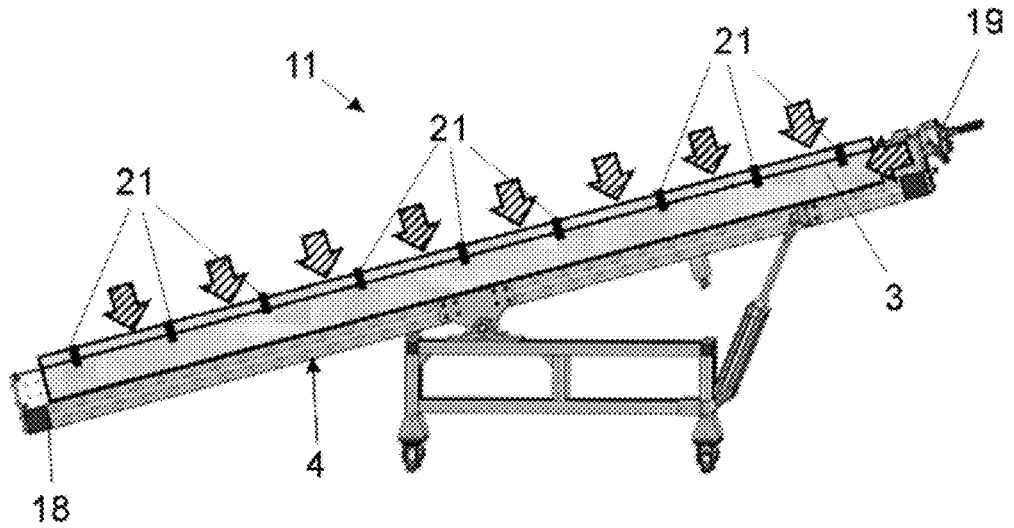
FIG. 12.—It shows a side elevation view of the bench with the closing system of molds shown in the FIG. 11.

And, in another option of embodiment, shown in the FIGS. 11 and 12, the closing system (11) of the two parts (a, b) of the mold (3) is a closing system by axial and radial pressure that comprises a fixed threaded screw-shaped device (21), According to the FIG. 12, it can be seen how in the bench (4) where several molds (3) are incorporated, they are closed by their lower end with a lower lid (18) and by their top end, after they have been filled, with a gate-shaped axial pressure element (19) as well as along them with several radial pressure threaded screws (21).

Alternatively, as in the case shown in the example of the FIG. 1, the closing system (11) is a module independent from the bench (4) where the molds (3) are previously closed for example by means of girths or clamps (3') that keep them closed when the polyurethane foams and pressure is exerted from inside.

Preferably, the molds (3) are manufactured by extrusion, without any type of further modification or adaptation and they are open by their two ends. They can be formed by a single tubular extruded part or by two extruded parts that form the respective parts (a,b) of the molds (3) that are fixed to each other in the closing system (11) that fastens them in vertical position.

In the FIGS. 2-A, 2-B and 2-C, two examples of embodiment of the said profiles can be seen forming the two parts (a,b) of the mold (3).

Concretely, in the FIG. 2-A, an example of two extruded parts forming the two parts (a,b) of a first example of mold (3) for forming a polyurethane part (9) profile-shaped for a window frame, in the FIG. 2-B an example of two other extruded parts forming the two parts (a, b) of a second example of mold (3) for forming another profile-shaped polyurethane part (9) for a window leaf and in the FIG. 2-C the respective parts (9) of polyurethane obtained with the said molds (3).

Optionally, the system comprises a system (12) for covering parts (9) of polyurethane obtained, in which it is proceeded to apply on them a coating or finish covering after taking them apart from the mold (3), likewise, a dispensing system (13) of parts (9) having been provided, that transfers them from the outlet belt (14) of the opening system (8) of the molds (3) to the said covering system (12).

Although it was not represented, the said covering system (12) can also include cutting means to eliminate a discardable portion of the part, preferably at its top end, in which holes and cavities formed by the $CO_2$ bubbles had remained accumulated.

Figure 4:
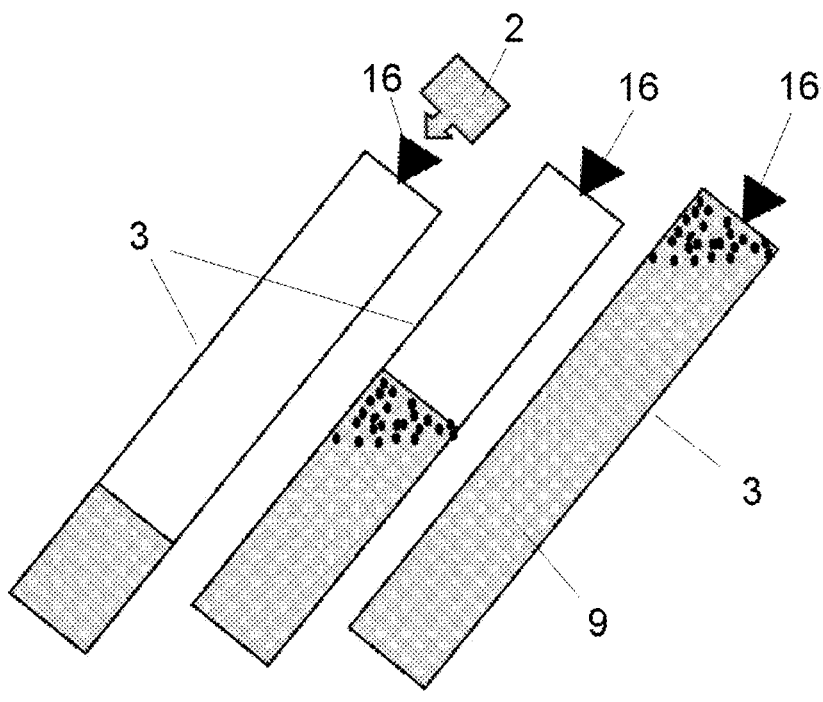
FIG. 4.—It shows a schematic side elevation view of several molds in the vertical filling step, according to the invention, with injection of material by the top end.

According to the FIG. 4, a schematic representation of the arrangement of the tilted molds (3) can be seen according to the system of the invention, in an example with vertical filling by its top end, through the injection system (2), the top end of the part (9) of polyurethane obtained can be seen, with bubbles only in a portion of its top end, which allows they can be discardable. In this option, the open end of the mold (3) for the inlet of material serves in turn as air outlet (16), which occurs at the same time, therefore, it is only necessary that the mold (3) is open by its top end.

Figure 5:
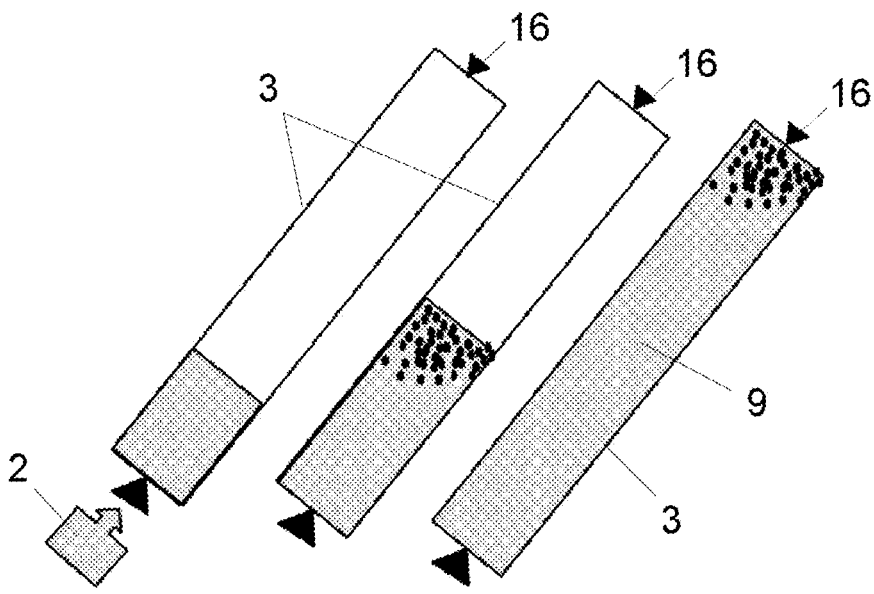
FIG. 5.—It shows a side elevation view of several molds in vertical filling step, according to the invention, with injection of the material by the lower end.

On its side, in the FIG. 5, an alternative option can be seen in which the material inlet by means of the injection system (2) occurs by the lower part of the molds (3), in which case the existence of an air outlet (16) is contemplated at the top end of the mold (3). This option, although it requires that the mold is open by its two ends, possesses the advantage of avoiding staining and turbulence during the polyurethane liquid resin drop.

According to the FIG. 3, the difference can be seen of creating bubbles on the full extent of the top face of the polyurethane material when the position of the molds (3) is horizontal, as it occurs according to the prior art, where, with a material inlet (2) the existence of many air exhaust outlets (16) is required to minimize it.

Figure 13:
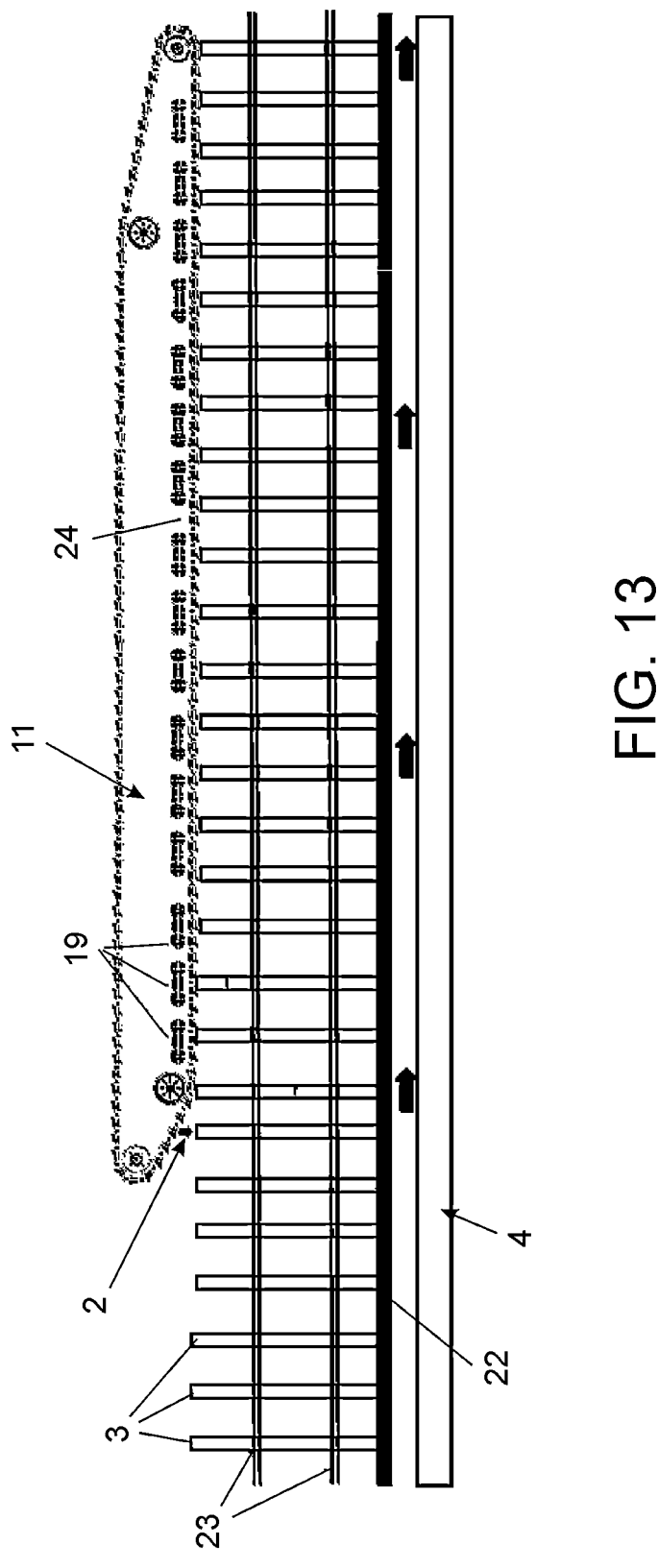
FIG. 13.—It newly shows a schematic representation of the main elements of the system for manufacturing polyurethane cast products having a constant section object of the invention, in this case in an example for injection in line with moving bench.

On the other hand, regardless all the above, in an optional embodiment appearing in the FIG. 13, the bench (4) includes moving means, for example a conveyor belt (22) on which the molds (3) move, preferably fastened through stabilizing guides (23), to be passing in line under the injection system or machine (2) of the product.

In addition, in this option of embodiment, as closing system (11) that at least closes exerting axial pressure, an axial pressure element (19) is included that closes the top end of the molds (3) and that, preferably, is formed by rollers integrated in a top closing belt (24) allowing to carry out the in-line injection process, either continuous or half continuous of the molds (3).

Last, it shall be pointed out that, preferably, the polyurethane product used to fully or partly feed the system feeder (1) comprises, full or partly, polyurethane coming from recycled parts (9'), previously made in the system itself, after a prior crushing process of them in a micronized crushing device (15) provided in the system prior to the feeder (1).

Sufficiently disclosed the nature of this invention, as well as the manner of implementing it, it is not deemed necessary to extend anymore its explanation in order that any man skilled in the art understands its scope and the advantages arising from it.

The invention claimed is:

1. A process for manufacturing polyurethane cast products having a continuous section, characterized in that it comprises:

placing and fastening an injection mold (3) on a bench that avoid a mold opening during a polyurethane foaming, where the mold (3) is manufactured by extrusion without any further modification or adaptation, the mold (3) thus having a fixed cross-sectional profile with open ends, closing the mold (3) with the fixed cross-sectional profile while allowing polyurethane injection through one end of the mold (3), polyurethane injection through one end of the mold (3), arranged tilted or in a vertical direction on the bench (4), to accumulate any holes or cavities of autogenous $CO_2$ bubbles, only at a top part of the mold (3) during the polyurethane foaming process, waiting for the polyurethane to be expanded, and moving the mold (3).

2. The process for manufacturing polyurethane cast products having a continuous section according to claim 1, further comprising carrying out a change in the tilted or the vertical direction of the mold (3).

3. The process for manufacturing polyurethane cast products having a continuous section according to claim 1, wherein, the polyurethane injection in the mold (3) arranged tilted or in the vertical direction, the injection of polyurethane is carried out by the open top end of the mold (3) that serves for the material inlet and as air outlet (16) which occurs at same time.

4. The process for manufacturing polyurethane cast products having a continuous section according to claim 1, wherein, in the step of the polyurethane injection in the mold (3), arranged tilted or in the vertical direction, the product injection is carried out by a open lower end of the mold (3) in which case an air outlet (16) is contemplated at the top end of the mold (3).

5. The process for manufacturing polyurethane cast products having a continuous section according to claim 1, wherein the polyurethane injection in the mold (3) arranged tilted or in the vertical direction is carried out by a manual process with the molds (3) arranged fixed directly on the bench (4).

6. The process for manufacturing polyurethane cast products having a continuous section according to claim 1, wherein the polyurethane injection in the mold or molds (3) arranged tilted or in the vertical direction is carried out continuously or semi-continuously, on a conveyor belt where the mold or molds are being positioned so that the injection is multiple and, sequential.

7. The process for manufacturing polyurethane cast products having a continuous section according to claim 6, wherein the conveyor belt is linear.

* * * * *